United States Patent [19]
Smith et al.

[11] Patent Number: 5,860,082
[45] Date of Patent: Jan. 12, 1999

[54] METHOD AND APPARATUS FOR ALLOCATING STORAGE IN A FLASH MEMORY

[75] Inventors: Kevin B. Smith, Camano Island; P. Keith Garvin, Lake Stevens, both of Wash.

[73] Assignee: Datalight, Inc., Arlington, Wash.

[21] Appl. No.: 623,661

[22] Filed: Mar. 28, 1996

[51] Int. Cl.$^6$ .................................................. G06F 12/06
[52] U.S. Cl. ............................. 711/103; 711/202; 395/500
[58] Field of Search ..................... 711/103, 154, 711/156, 171, 202; 395/500

[56] References Cited

U.S. PATENT DOCUMENTS

| | | | |
|---|---|---|---|
| 4,430,727 | 2/1984 | Moore et al. | 711/115 |
| 4,511,964 | 4/1985 | Georg et al. | 711/202 |
| 4,642,759 | 2/1987 | Foster | 395/500 |
| 4,644,494 | 2/1987 | Muller | 711/152 |
| 4,757,533 | 7/1988 | Allen et al. | 380/25 |
| 4,775,932 | 10/1988 | Oxley et al. | 707/206 |
| 4,800,520 | 1/1989 | Iijima | 707/206 |
| 4,821,177 | 4/1989 | Koegel et al. | 711/149 |
| 4,959,315 | 9/1990 | Nelson et al. | 435/167 |
| 5,047,989 | 9/1991 | Canepa et al. | 365/238.5 |
| 5,070,474 | 12/1991 | Tuma et al. | 395/500 |
| 5,077,737 | 12/1991 | Leger et al. | 356/336 |
| 5,101,490 | 3/1992 | Getson, Jr. et al. | 395/838 |
| 5,111,385 | 5/1992 | Hattori | 711/157 |
| 5,131,089 | 7/1992 | Cole | 395/500 |
| 5,163,021 | 11/1992 | Mehrotra et al. | 365/185.03 |
| 5,193,184 | 3/1993 | Belsan et al. | 711/4 |
| 5,200,959 | 4/1993 | Gross et al. | 371/21.6 |
| 5,297,148 | 3/1994 | Harari et al. | 370/10.2 |
| 5,301,288 | 4/1994 | Newman et al. | 711/202 |
| 5,404,485 | 4/1995 | Ban | 711/202 |
| 5,418,752 | 5/1995 | Harari et al. | 365/218 |
| 5,430,859 | 7/1995 | Norman | 711/103 |
| 5,437,020 | 7/1995 | Wells et al. | 395/182.04 |
| 5,438,573 | 8/1995 | Mangan et al. | 371/10.3 |
| 5,471,478 | 11/1995 | Mangan et al. | 711/202 |
| 5,535,357 | 7/1996 | Moran | 711/103 |
| 5,537,475 | 7/1996 | Hasbun et al. | 380/30 |
| 5,602,987 | 2/1997 | Harari et al. | 395/182.06 |
| 5,603,001 | 2/1997 | Sukegawa | 711/103 |
| 5,611,067 | 3/1997 | Okamoto | 711/103 |
| 5,630,093 | 5/1997 | Holzhammer | 711/115 |
| 5,652,865 | 7/1997 | Rawlings | 711/171 |

FOREIGN PATENT DOCUMENTS

| | | |
|---|---|---|
| 2088442 | 7/1993 | Canada . |
| 0 175 458 A2 | 3/1986 | European Pat. Off. . |
| 0 392 895 A2 | 10/1990 | European Pat. Off. . |
| 2 251 323 | 7/1992 | United Kingdom . |
| 2 251 324 | 7/1992 | United Kingdom . |

OTHER PUBLICATIONS

Microsoft Flash File System, Media Control Structures, Apr. 20, 1992.

*Primary Examiner*—Tod R. Swann
*Assistant Examiner*—Christopher S. Chow
*Attorney, Agent, or Firm*—Christensen O'Connor Johnson & Kindness PLLC

[57] ABSTRACT

A method and apparatus are provided for operating a flash memory (24) as a client memory, wherein the flash memory comprises a partition (28) of physical data storage locations. The partition is divided into a plurality of units (30). Each unit is organized into a plurality of allocations (60) where each allocation includes a plurality of blocks (58) of physical data storage locations. The partition is organized into a plurality of regions (46) which define a client address space such that each region represents a portion of the client address space. Interfacing the client address space with the physical address space requires maintaining an allocation list (56) for each unit that includes an allocation (68) entry describing each allocation in the unit. Each allocation entry includes a first field (70) storing a client start address for the allocation in the client address space and a second field (72) storing an allocation length indicating the number of blocks of data in that allocation. A third field (74) stores a status of the allocation, i.e., either valid, pending, bad or discarded, and a fourth field (76) stores a physical start address for the allocation in the partition.

37 Claims, 15 Drawing Sheets

5,860,082

METHOD AND APPARATUS FOR ALLOCATING STORAGE IN A FLASH MEMORY

FIELD OF THE INVENTION

This invention generally relates to flash memory, and more specifically to a method and apparatus for allocating storage in flash memory so that the flash memory can be addressed as though it were a secondary, read/write nonvolatile storage medium.

BACKGROUND OF THE INVENTION

Client memory arrangements have been provided which conceptually expand the amount of secondary storage, i.e., the number of addressable storage locations that are available in secondary storage of a typical computer system. The typical computer system includes a processor, a memory and an input/output system. Information including data and instructions for processing data are stored in memory in a plurality of addressable storage locations. The processor stores data to and retrieves data from memory and processes the data accordingly. The main, physical memory of the computer system will normally include a primary, volatile storage memory, such as a random access memory (RAM) and a secondary, multiple read/write, nonvolatile storage medium, such as a tape or disk. The storage capability of the computer system is typically limited to the amount of physical data storage locations available in such memory.

Client memory permits processing of an application by providing an auxiliary storage medium that can be addressed as though it were part of the physical secondary memory. Flash memories can be used as such auxiliary storage mediums. Flash memories are nonvolatile memories similar in functionality and performance to an electronically erasable and programmable read-only memory (EEPROM). Consequently, they are write once, read many type memories. However, flash memories allow an in-circuit, programmable, operation to erase only certain blocks of memory at a time or the entire memory at once.

In a client memory arrangement, a client address space having a plurality of client addressable locations, each identified by a client address, is provided in an auxiliary storage medium. The client addresses in the client address space can be translated into physical addresses of physical storage locations in the auxiliary storage medium. When flash memory is used as the auxiliary storage medium, the client address space is maintained on the flash memory device. Data can then be transferred to the flash memory device under control of an operating system program from storage locations in the physical secondary memory, and vice versa. However, flash memories are not compatible with typical existing operating system programs, because flash memories are not multiple read/write memories, i.e., data cannot be written to an area of flash memory in which data has previously been written, unless a larger area is first erased.

Accordingly, there is a need for a method and apparatus for allocating client memory storage using a flash memory that is addressed as though it were a secondary, multiple read/write, non-volatile storage medium. Such a method and apparatus should permit flash memory to be written and read multiple times during client memory allocation without any knowledge of or intervention by a user. In addition, the method and apparatus should permit large portions of data to be written and read from flash memory at one time. The present invention is directed to providing such a method and apparatus.

SUMMARY OF THE INVENTION

In accordance with this invention, a method is provided for operating flash memory as a client memory, wherein the flash memory comprises at least one partition of data storage locations. The at least one partition is divided into a plurality of units. Each unit is organized into a plurality of allocations where each allocation includes at least one block of physical data storage locations. However, the allocation normally includes multiple blocks of storage locations. The partition is also organized into a plurality of regions which define a client address space such that each region represents a portion of the client address space. Interfacing the client address space with the physical address space of the partition requires maintaining an allocation list for each unit that includes an allocation entry describing each allocation in the unit. Each allocation entry includes a client start address for a corresponding allocation in the client address space and an allocation length indicating the number of blocks of data in that allocation. In addition, the allocation entry includes a status of the allocation, i.e., either valid, pending, bad or discarded, and a physical start address within the unit for the allocation.

Maintaining the allocation list for each unit requires reading, writing and discarding data to and from the unit. Data is requested to be written to the partition at a given client range, where the given client range comprises a given client start address in the client address space and a given allocation length for the data to be written. The given client range is used to determine at least one of the regions of the partition in which to write the data. Once the region is determined, it is determined if there is available space in the region to write the data. If so, as much data as possible is written to at least one unit of the region. Writing the data to the unit creates an allocation in the unit having a physical start address in the unit, an allocation length and a status indicating that data is currently being written to the allocation. The new allocation entry is then added to the allocation list for the unit.

Data is requested to be read from the partition at a given client range which is used to determine at least one of the regions of the partition from which to read the data using the given client range. The allocation list of each unit in that region is scanned for an allocation entry having a client start address and an allocation length that overlap the given client start address and given allocation length. A physical start address for the data to be read is then determined from the overlapping client addresses and allocation lengths. Once the physical address is determined, the data is read from the physical start address.

Further aspects of this invention include reclaiming space from a region if there is not enough space in the region to write the data, and discarding superseded data. Finally, an apparatus capable of performing the functions described above represents a further aspect of this invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
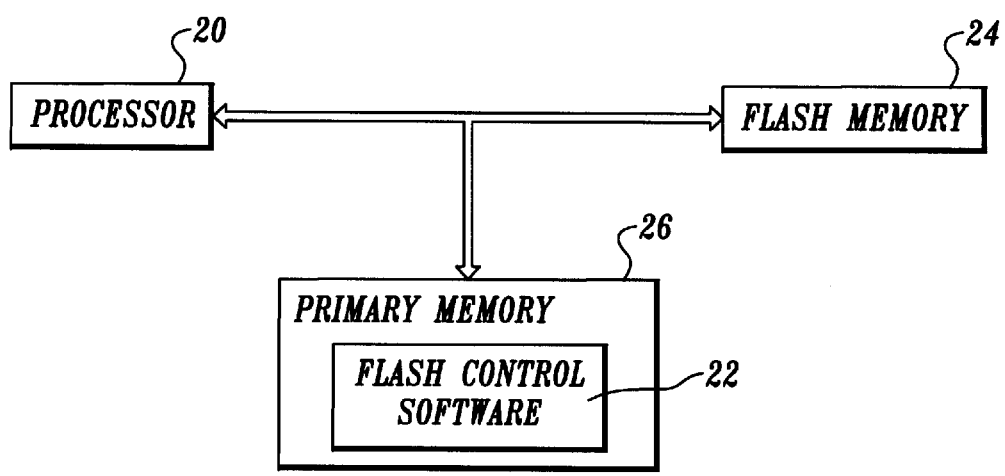
FIG. 1 is a block diagram illustrating the functional components of a system used to allocate client memory storage using a flash memory in accordance with the present invention.

A system for implementing a flash memory 24 in accordance with the present invention is shown in FIG. 1. A processor 20 is used to read data from, and write data to specific address locations in an auxiliary storage medium, i.e., a flash memory 24, via flash control software 22 that provides a fully writable client address space so that flash memory 24 emulates a secondary, multiple read/write, non-volatile storage medium. The flash control software 22 is stored in a primary memory 26 comprising a read-only memory (ROM) and a random access memory (RAM).

Figure 2:
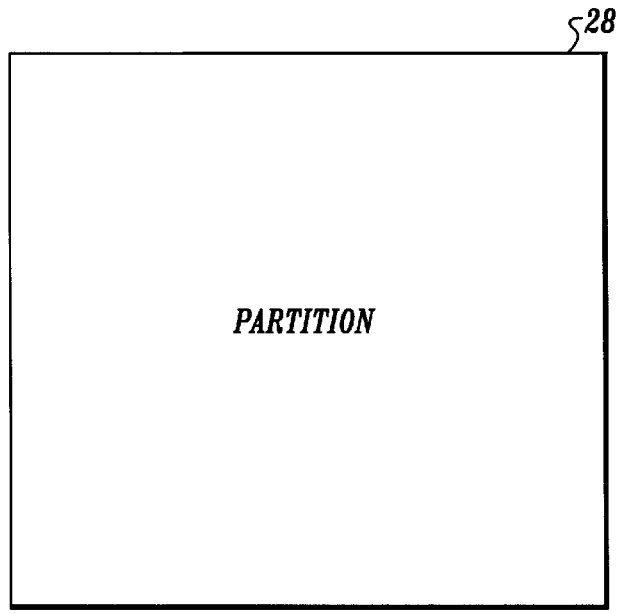
FIG. 2 is a block diagram of the flash memory comprising a single partition.
Figure 3:
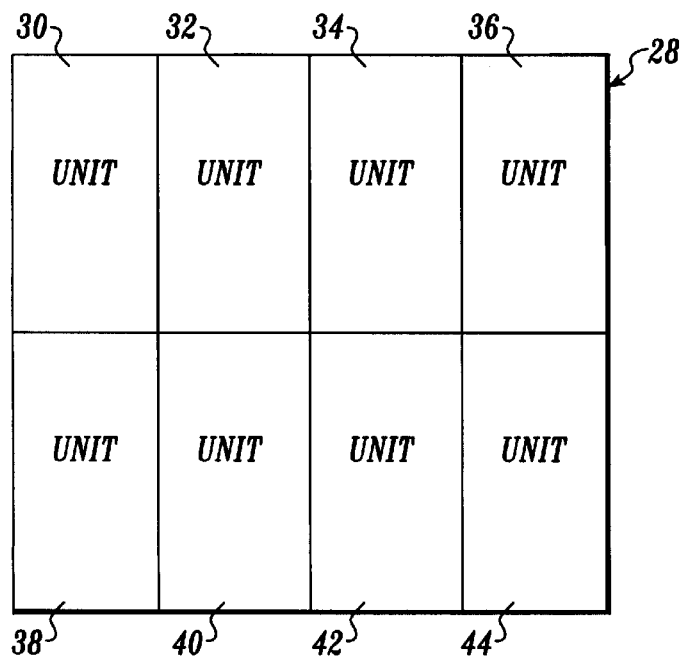
FIG. 3 is a block diagram of the partition shown in FIG. 2 divided into a plurality of units.

In the actual embodiment of the present invention shown in FIG. 2, flash memory 24 comprises a single partition 28 used by the flash control software 22 to provide a client address space. The partition 28 comprises a plurality of physically addressable data storage locations in which the processor 20, via the flash control software 22, may write data using a client start address in the client address space and subsequently from which the processor 20 can read data using a client start address. As shown in FIG. 3, the partition 28 is divided into a plurality of units 30–44. Each unit is a group of one or more erasable flash sectors. However, it will be appreciated that the flash sectors need not be contiguous. When a unit is to be erased, all of the flash sectors within that unit are erased. Those of ordinary skill in the art will appreciate that flash memory 24 may be organized in numerous different configurations without departing from the scope of the present invention. For example, flash memory 24 may include multiple partitions and portions of flash memory 24 may be reserved for use by other software operations.

Figure 4:
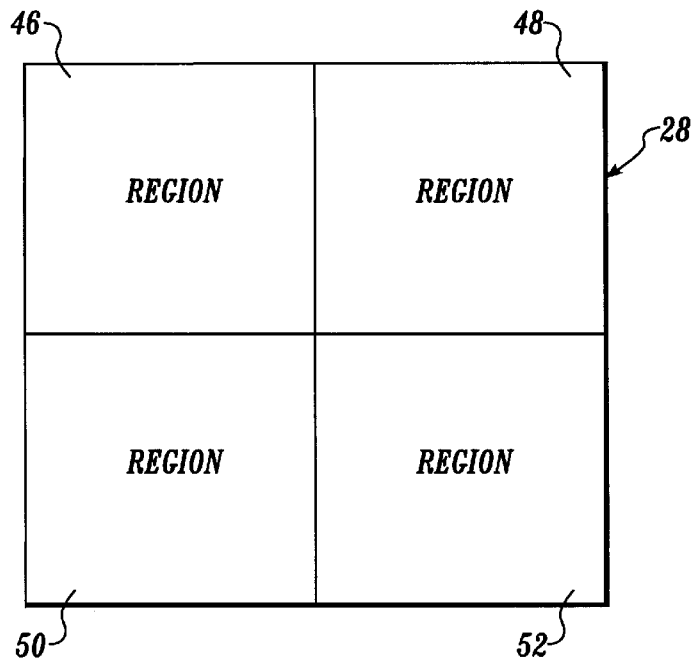
FIG. 4 is a block diagram of the partition shown in FIG. 2 organized into a plurality of regions.
Figure 5:
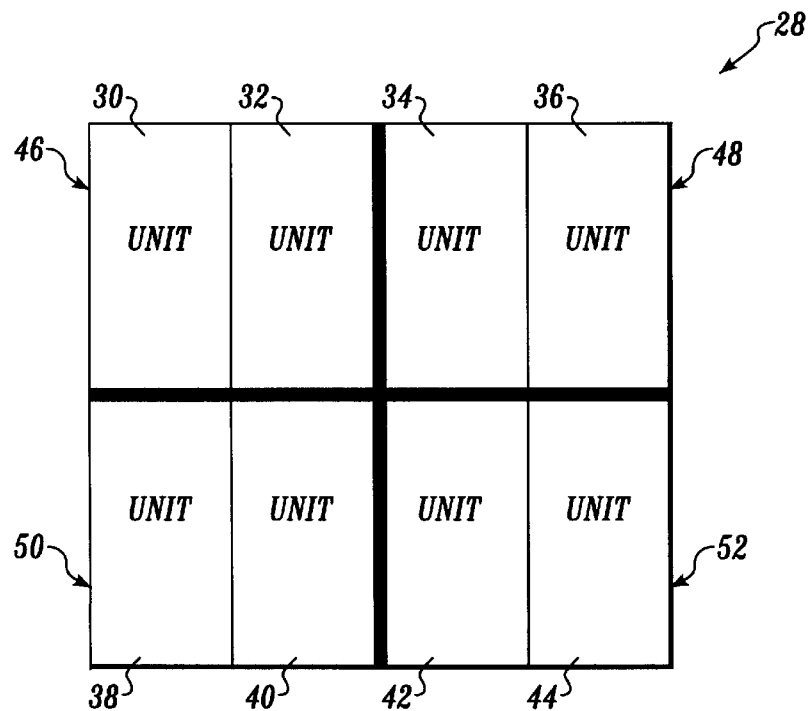
FIG. 5 is a block diagram of the units shown in FIG. 3 organized in a plurality of regions.

An important aspect of the present invention is that partition 28 is organized into a plurality of regions which define a fully writable client address space. Within each region, some space may be set aside for data structures and some for a cushion. Thus, the remaining space in the region defines the fully writable client address space with client addressable storage locations. For example, in FIG. 4 the partition 28 is organized into four regions 46, 48, 50 and 52. Each region 46, 48, 50 and 52 defines a portion of client address space which represents the physical address space provided by a pair of units 30–44 of the partition 28. For example, region 46 consists of contiguous units 30 and 32 of partition 28 and the client addresses found in the client address space of region 46 are those client addresses that can be used by the processor to read and write data to physical addresses in units 30 and 32. Consequently, if the processor 20 is given a client start address from which to read data, only the units of the region in which the client start address falls must be examined to locate the data to be read, rather than examining the entire partition 28.

It will be recognized by those of ordinary skill in the art that the partition 28 can be organized into any number of regions containing at least one unit without departing from the scope of the present invention. However, the units comprising a region need not be contiguous. For example, the partition 28 may be organized such that a region comprises noncontiguous units 30 and 36. Further, although each region will generally consist of the same number of units, it is possible that one region may comprise fewer units than the others, depending on the size of the partition 28. The remaining space, therefore, will define a smaller portion of client address space. Finally, since a portion of each region is set aside for a cushion and for data structures, the size of the client address space defined by the regions will be smaller that the size of the physical address space provided by the units comprising that region.

Figure 6:
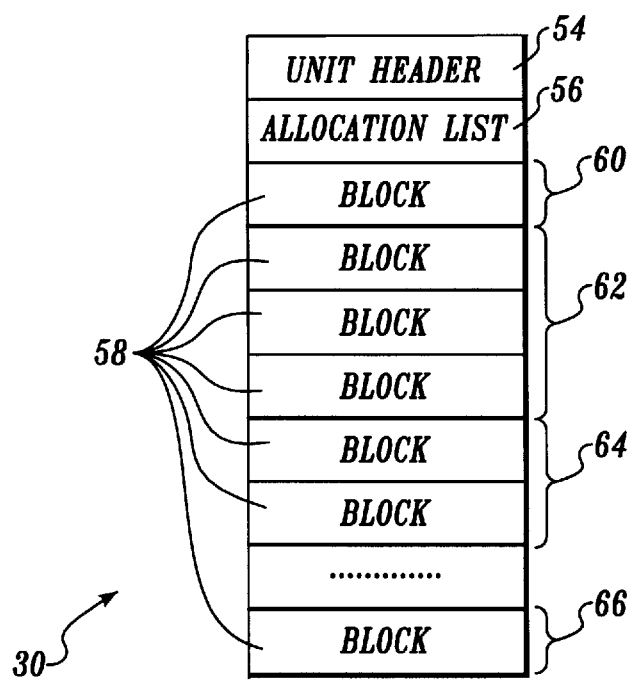
FIG. 6 is a block diagram of one of the units shown in FIG. 3.

FIG. 6 illustrates a typical unit, such as unit 30, found in the partition 28. Unit 30 is divided into a plurality of physically addressable blocks 58. Each block 58 is comprised of a plurality of physical data storage locations and every block 58 in partition 28 is the same size. At least one block per unit is used to hold a unit header 54. The unit header defines characteristics of the unit and the partition in which the unit is located. For example, the unit header may contain a field indicating a status of the unit, e.g., valid or spare. A spare unit generally contains written data only in the unit header and is only used for reclaiming space in a region, while a valid unit may contain data outside of the unit header and is used for reading and writing data. During operation, units may alternate between valid and spare by means of a reclamation procedure described in more detail below. The unit header of unit 30 may also contain fields indicating a start address of the partition 28, a total number of units in the partition 28, a total number of spare units in the partition 28, a size of the unit 30 in bytes, a total size in bytes of the client address space available for use in the partition 28, a client start address for the client address space available on the unit 30, a size in bytes for a typical region, and any other information deemed useful for a particular configuration of flash memory 24.

As shown in FIG. 6, the unit header 54 of unit 30 is followed by an allocation list 56 and the physical address space to and from which data is to be written and read. As described in more detail below, data is typically written to the unit in large portions of multiple blocks 58. Thus, the present invention takes advantage of the fact that many applications and operating systems will read and write data to memory in portions larger than a single block 58. A group of one or more blocks 58 that contain contiguous data are known as an allocation. In the actual embodiment, allocation 60 consists of a single block 58, while allocation 62 consists of three blocks, and so on. Thus, allocations are variable in length, and the length of an allocation is defined as the number of blocks 58 comprising the allocation.

The interface between the client address space, i.e., the regions, and the physically addressable storage locations of the unit 30, i.e., the allocations, is provided by a variable length allocation list 56. In the actual embodiment shown in FIG. 6, the allocation list 56 is stored in one or more blocks 58 of the unit 30 immediately following the unit header 54. However, if flash memory 24 comprises a memory device that provides accessing of redundant or hidden storage locations, those of ordinary skill in the art will recognize that unit 30 may be organized such that the allocation list 56 is stored in the redundant or hidden area of the unit, and the allocations are stored following the unit header 54. Regardless of where the allocation list is stored in the unit 30, the allocation list 56 comprises a number of allocation entries 68, each of which describe an allocation in unit 30 as shown in FIG. 7B. For example, each allocation 60, 62, 64, and 66 in unit 30 is represented by a corresponding allocation entry 260, 262, 264, and 266 in the allocation list 56.

Figure 7A:
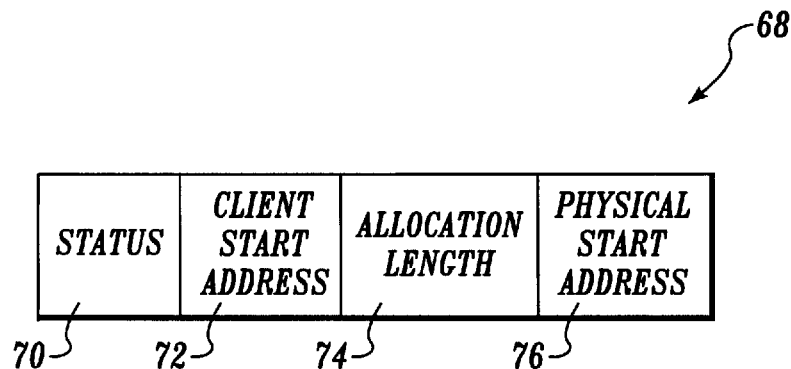
FIGS. 7A and 7B are block diagrams illustrating an allocation list of the unit shown in FIG. 6.
Figure 7B:
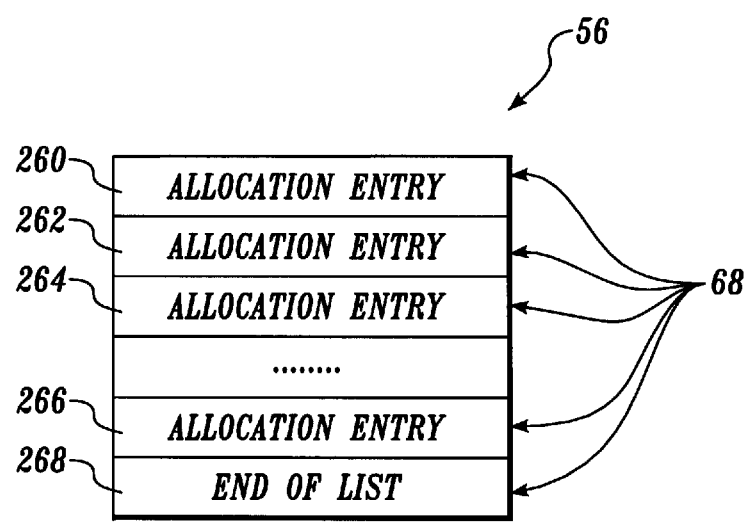

An allocation entry 68 comprises at least four fields of information which describe the corresponding allocation as shown in FIG. 7A. A first field 70 indicates the status of the allocation as valid, pending, discarded or bad. Generally, a valid status indicates that the data in the allocation is current and valid. However, as will be described in more detail below, a valid status may indicate that data in the allocation has been superseded, depending on the circumstances. A pending status indicates that a write operation is in progress for that allocation. A discarded status indicates that the data in the allocation is no longer current and can be reclaimed. Finally, a bad status indicates that blocks of that allocation are unusable. Those of ordinary skill in the art will recognize that the status stored in first field 70 may indicate a status other than valid, pending, discarded or bad; however, a description of those is not necessary to understand the present invention.

A second field 72 stores a client start address for the allocation in the client address space relative to the region 46 in which the unit 30 exists. A third field 74 contains the length of the allocation, i.e., the number of blocks 58 of data comprising the allocation. Finally, a fourth field 76 contains a physical start address for the allocation relative to the unit.

An allocation entry 68 is added to the allocation list 56 each time an allocation is written to unit 30. Referring to FIGS. 7A and 7B, allocation entry 260 is added to the allocation list 56 when allocation 60 is written to the unit 30, allocation 262 is added to the allocation list 56 when allocation 62 is written to the unit 30, and so on. The end of the allocation list is signaled by an allocation entry 268 whose allocation length in field 74 is in an erased state.

It will be appreciated that partition 28 must be properly formatted as described above, e.g., as partition organized into a plurality of units, each unit having an allocation list, etc., using known methods before any of the operations described below are performed.

Figure 8:
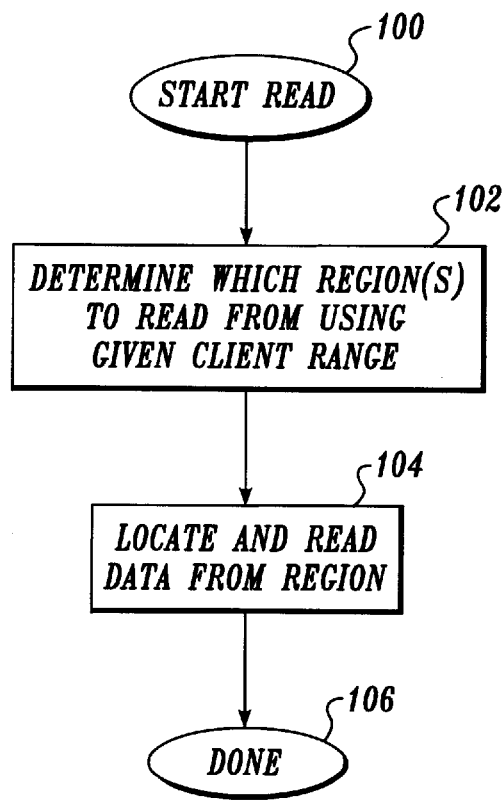
FIGS. 8 and 9 are flow diagrams that illustrate the logic used for reading data from the flash memory.
Figure 9:
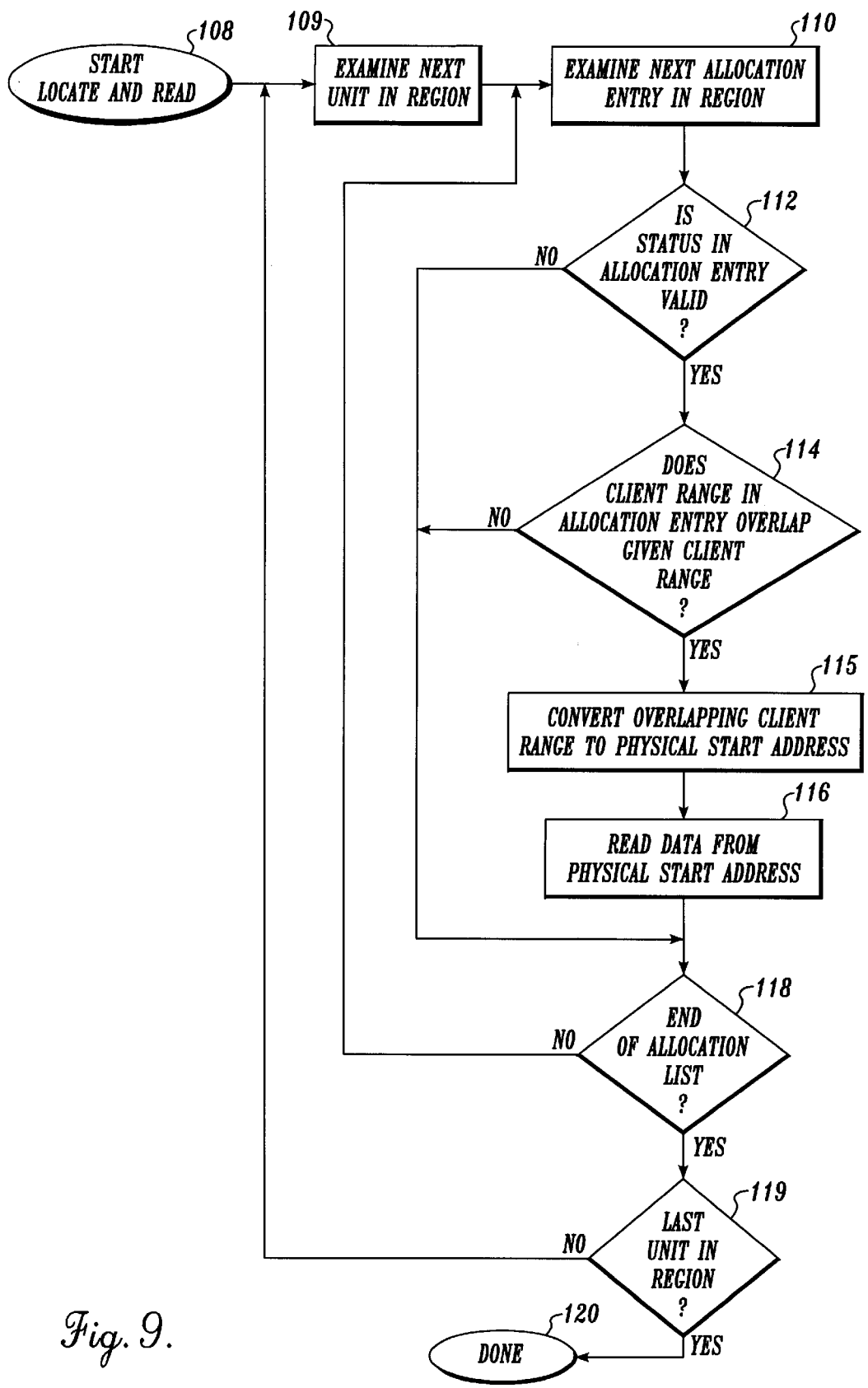

Now that the organization of flash memory 24 has been described, the allocation of storage in the flash memory will be discussed in more detail. FIGS. 8 and 9 illustrate the logic embodied in the flash control software 22 and used by the processor 20 for reading data from the partition 28 using a client start address and an allocation length provided by the processor 20. The given client start address and allocation length are referred to as a given "client range" wherein a client range is a range of client addresses having a starting address equal to a client start address and a client end address equal to the client start address plus an allocation length. It is to be understood that the client start address and the allocation length comprising a client range can be provided by the processor 20 or can be the client start address and allocation length stored in fields 72 and 74 of an allocation entry.

The logic starts in a block 102 of FIG. 8, where the region of the partition 28 representing the units from which the data is to be read is determined using the given client range. More specifically, the region is determined by determining if the given client start address falls within the client address space, i.e., a range of client addresses, defined by that region. Once the appropriate region from which data is to be read is determined, the logic proceeds to a block 104 where the data is located and read from the units of the partition 28 found in the region.

The logic used to locate and read the data within the region is more specifically illustrated in FIG. 9. Generally, for each unit in the region, the allocation list is scanned in order to locate the allocation(s) in the unit containing the data to be read. More specifically, each allocation entry in each allocation list is examined to determine if any data to be read is located in the allocation corresponding to that allocation entry. The logic for the read operation begins in a block 109, where a next unit in the region is examined in order to locate the data. In a block 110, a next allocation entry of the unit's allocation list is examined. The logic then proceeds to a decision block 112 where it determines if the status stored in field 70 of the allocation entry indicates that the data in the corresponding allocation is valid. If the results are positive, i.e., the status is valid, the logic proceeds to a decision block 114 where it determines if the client range stored in the allocation entry (the "stored client range") overlaps the given client start address and given allocation length. In other words, the logic determines if the client addresses comprising the given client range overlap the client addresses comprising the stored client range.

If the results of decision block 114 are positive, at least a portion of the data to be read is located in the allocation corresponding to the examined allocation entry. However, the data may comprise the entire allocation or only a portion of the allocation. Thus, in a block 115, a physical start address and length for the data within the unit must be converted from the overlapping given client range and the stored client range. First a client start address for the overlapping portion of given and stored client addresses is determined. Specifically, if the given client start address is higher than the stored client start address of the allocation entry, the client start address of the overlapping data is the given client start address. Otherwise, the client start address of the overlapping portion is merely the stored client start address. Next, an offset within the allocation is found by subtracting the stored client start address from the client start address of the overlapping portion of client addresses. The offset is then added to the physical start address found in field 76 of the allocation to yield the actual physical start address of the data being read. The length of the data to be read is merely the length of the overlapping portion of the given client range and the stored client range. Once the physical start address and length of the data are determined, the logic proceeds to a block 116 where the determined length of data is read from the unit at the converted physical start address.

Although data is read from the unit in block 116, it is possible that only a portion of the data is located in that allocation because the data was originally written to a plurality of allocations. Thus, in decision block 118 the logic determines if the end of the allocation list has been reached. If not, the next allocation entry in the unit is examined in block 110 to determine if the remaining data is located in an allocation is somewhere else in that unit. It will also be appreciated that it is possible that the data being read was stored in more than one unit. Thus, if the results of decision block 118 are positive, the logic determines in a decision block 119 if the last unit of the region has been examined.

If the results are negative, the logic returns to block 109 and the next unit in the region is examined. Blocks 109 through 119 are then repeated until all the last unit of the region has been examined and all possible data has been read from that unit.

Finally, it is possible that the data being read overlaps multiple regions of client address space. If such is the case, the results of decision block 119 will be positive even if the data has not been completely read. Those of ordinary skill in the art will recognize that in such cases, the logic illustrated in FIGS. 8 and 9 will merely be repeated for each region from which it is determined the data is to be read. However, it will be appreciated that all of the data may be read well before the last unit of the region is examined. Thus, the logic described above could be easily modified by one of ordinary skill in the art to merely exit the read operation when all of the data has been read.

Figure 10:
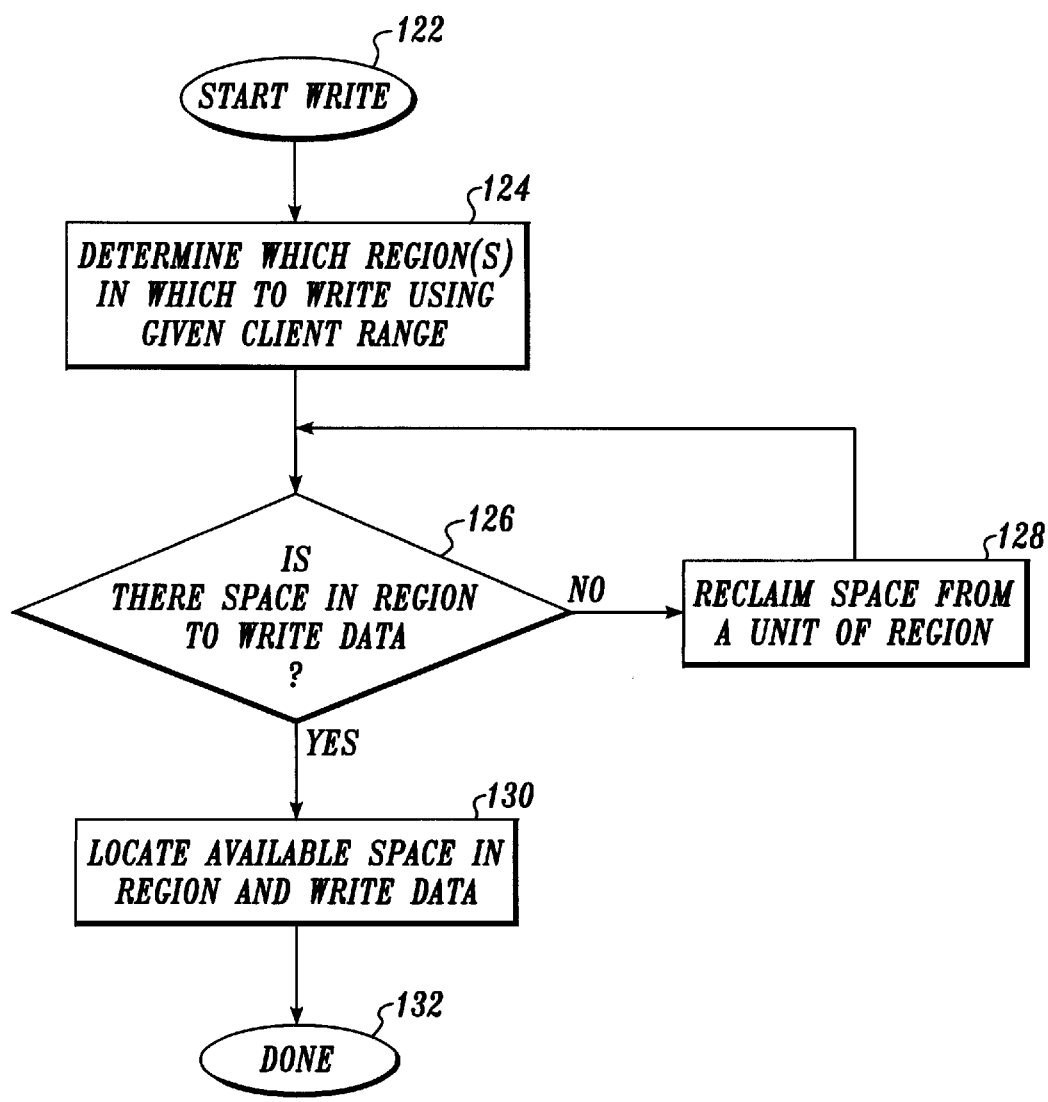
FIGS. 10 and 11 are flow diagrams illustrating the logic used for writing data to flash memory.
Figure 11:
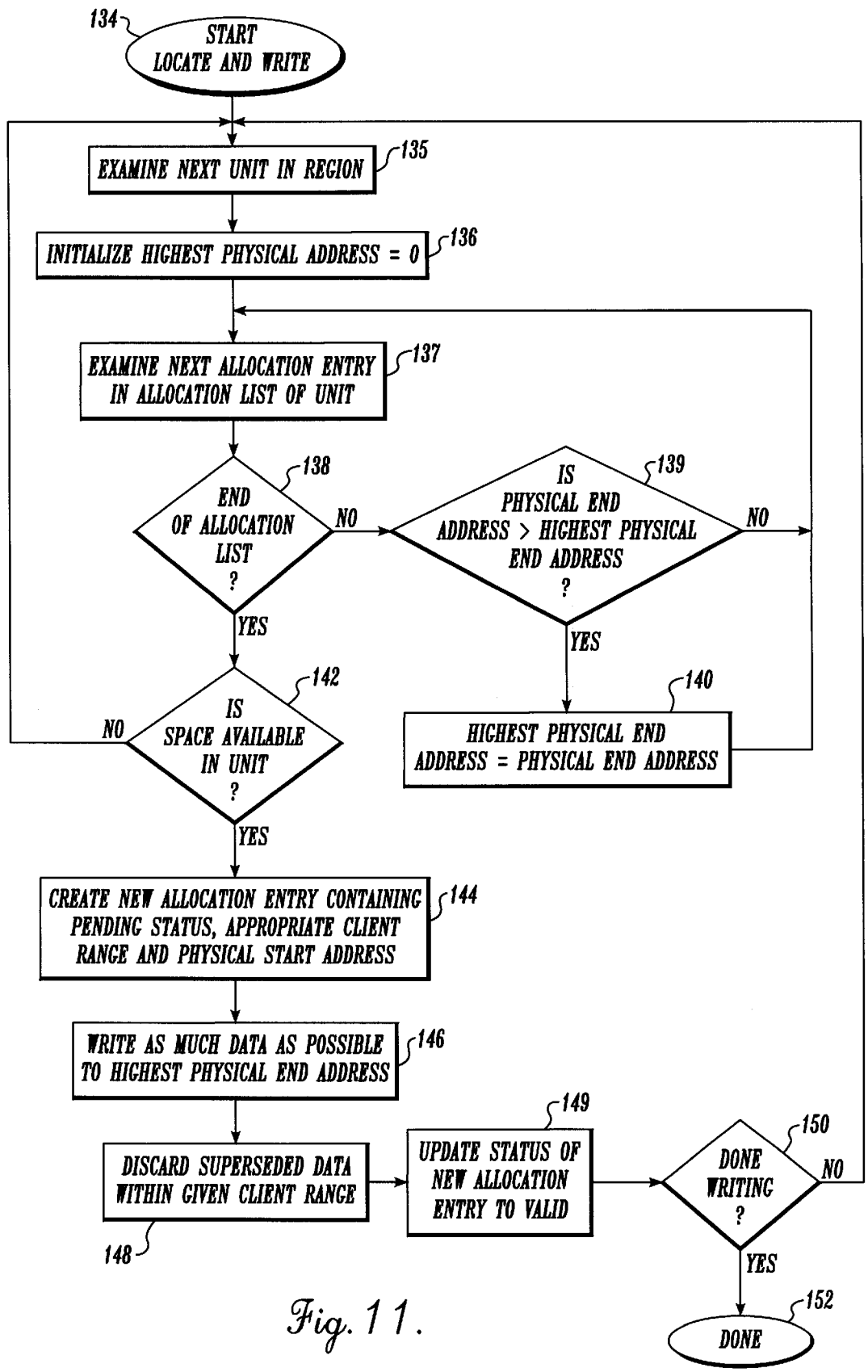

The logic embodied in the flash control software 22 and used by the processor 20 for writing data to flash memory 24 is illustrated in FIGS. 10 and 11. With respect to FIG. 10, the logic for the write operation begins in a block 124 where the region in which data is to be written is determined using the given client range. As discussed above in connection with the read operation, if a given client range falls within the client address space available in a region, that region is used to receive data.

Once the region is determined, the logic proceeds to a decision block 126 where it determines if there is available space in the units of that region to write the data. If the result is negative, the logic proceeds to a block 128 where space is reclaimed from a unit of the region. Reclamation of space from a unit of a region will be described in more detail below. However, it is important to note that as a result of the reclamation operation, all valid data will be transferred to a new unit in contiguous allocations of memory. Consequently, any allocations available for writing will be located immediately following the last allocation containing valid data.

Returning to decision block 126, if the results are positive, and there is available space in the region to write the data, the logic proceeds to decision block 130 where available space in the region is located and the data is written to that available space.

The logic employed by the present invention to locate available space in the determined region and write data to that available space is more specifically illustrated in FIG. 11. Essentially, writing data to the partition 28, like reading data from the partition 28, requires scanning the allocation list of each unit in the region. The difference is that the allocation list of each unit is being scanned to find a first available space in the unit in which to write, rather than to locate the data being read. It will be appreciated that the units need not be scanned in any particular order. The logic for doing so begins in a block 135 where a next unit in the region is examined. In block 136, a highest physical end address variable for an allocation in the unit is initialized to zero. As the allocation list for the unit is scanned, this variable keeps track of the highest physical end address occupied by any allocation in the unit.

The allocation list is scanned by examining each allocation entry. Thus, in a block 137, a next allocation entry in the allocation list of the unit is examined. In a decision block 138, the logic determines if the end of the allocation list has been reached. If the results are negative, the logic proceeds to a decision block 139, where it determines if a physical end address of the corresponding allocation, i.e., the physical start address of the allocation plus the allocation length stored in fields 76 and 74 of the examined allocation entry, is greater than the value stored in the highest physical end address variable. If so, the highest physical end address variable is reset equal to the physical end address of the allocation in block 140 and the logic returns to block 137 where the next allocation entry of the unit is examined. If the results of decision block 139 are negative, however, the highest physical end address variable is not reset and the logic returns directly to block 137. Blocks 137 through 140 are then repeated until all of the allocation entries have been examined. As a result, when the end of the allocation list is reached, the highest physical end address of any allocation in the unit will be determined and stored in memory, wherein the highest physical end address is the first available physical address in the unit for writing data and any physical address beyond the highest physical end address (but within the unit) is also available.

It becomes apparent that data will always be written and allocations always appended to the unit following the last written allocation in the unit. However, those of ordinary skill in the art will appreciate that over time, physical data storage locations in the unit may become corrupted and unusable, i.e., "bad blocks." In such cases, the bad blocks create gaps in the unit in which data cannot be written. Thus, data must be written around the bad blocks. It will be appreciated that the logic described above may be optimized to determine a first available physical address in the unit at which at least one block can be written. However, a description of such optimization is not provided because such is not necessary to an understanding of the present invention.

Once the entire allocation list has been scanned to determine the first available physical address in the unit, i.e., the highest physical end address, for writing data, the logic determines in a decision block 142 if any space in which to write the data is available in the unit. This is determined by merely comparing the highest physical end address with a physical end address of the unit (that can be stored in or calculated from information stored in the unit header). If the highest physical end address is not less than the physical end address of the unit, the unit does not contain available space and the logic returns to block 135 and blocks 135 through 142 are repeated until a first available physical address in a unit having available space is determined.

If the results of decision block 142 are positive, the logic proceeds to blocks 144 and 146 in which a new allocation entry for the data being written is added to the allocation list of the unit and in which as much of the data as possible is written to a new allocation beginning at the highest physical end address, i.e., the first available physical start address. Thus, the status field 70 of the newly written allocation will indicate a pending status for the new allocation, i.e., that a write operation is in progress. The client start address used in block 124 to determine the region in which to write is stored in the client start address field 72 and the length of the new allocation is stored in field 74. Finally, the physical start address for the new allocation in the unit, i.e., the first available physical address, is stored in field 76 of the new allocation entry.

The logic then proceeds to a block 148 where any data in the given client range that was superseded by the write operation, i.e., any allocations in the unit already containing data within the client range, is discarded, as will be described in more detail below. Finally, in a block 149, the status field 72 of the new allocation entry for the new allocation is updated to indicate that the write operation is complete. In other words, the status field 70 of the new allocation entry is updated from a pending status to a valid status.

As described above, only as much data as could fit in the unit was written in block 146. If a large amount of space is available in the unit, then a large portion of data, and perhaps, all of the data can be written to the unit at once, rather than piecemeal amongst various units. However, it is possible that some of the data cannot be written to the unit and further available space in another unit of the region must be found. Accordingly, after the new allocation entry is updated in block 149, the logic proceeds to a decision block 150 where it is determined if all of the data has been written. If the results are negative, the logic returns to block 135 where the next unit in the region is examined for available space. Blocks 138–150 are then repeated until all of the data has been written. Further, as in the read operation, if the given client range overlaps the client address space of more than one region, the logic illustrated in FIGS. 10 and 11 will be repeated for each region until all of the data has been written.

Figure 12:
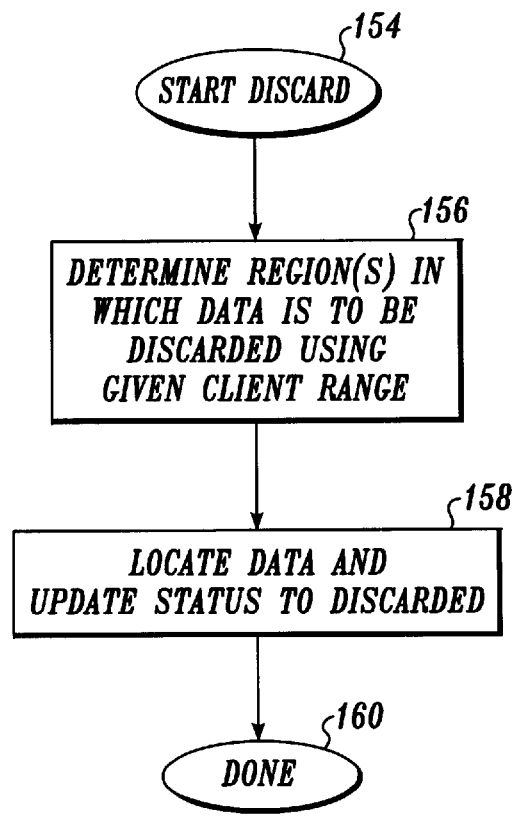
FIGS. 12, 13A and 13B are flow diagrams illustrating the logic for discarding data from flash memory.
Figure 13A:
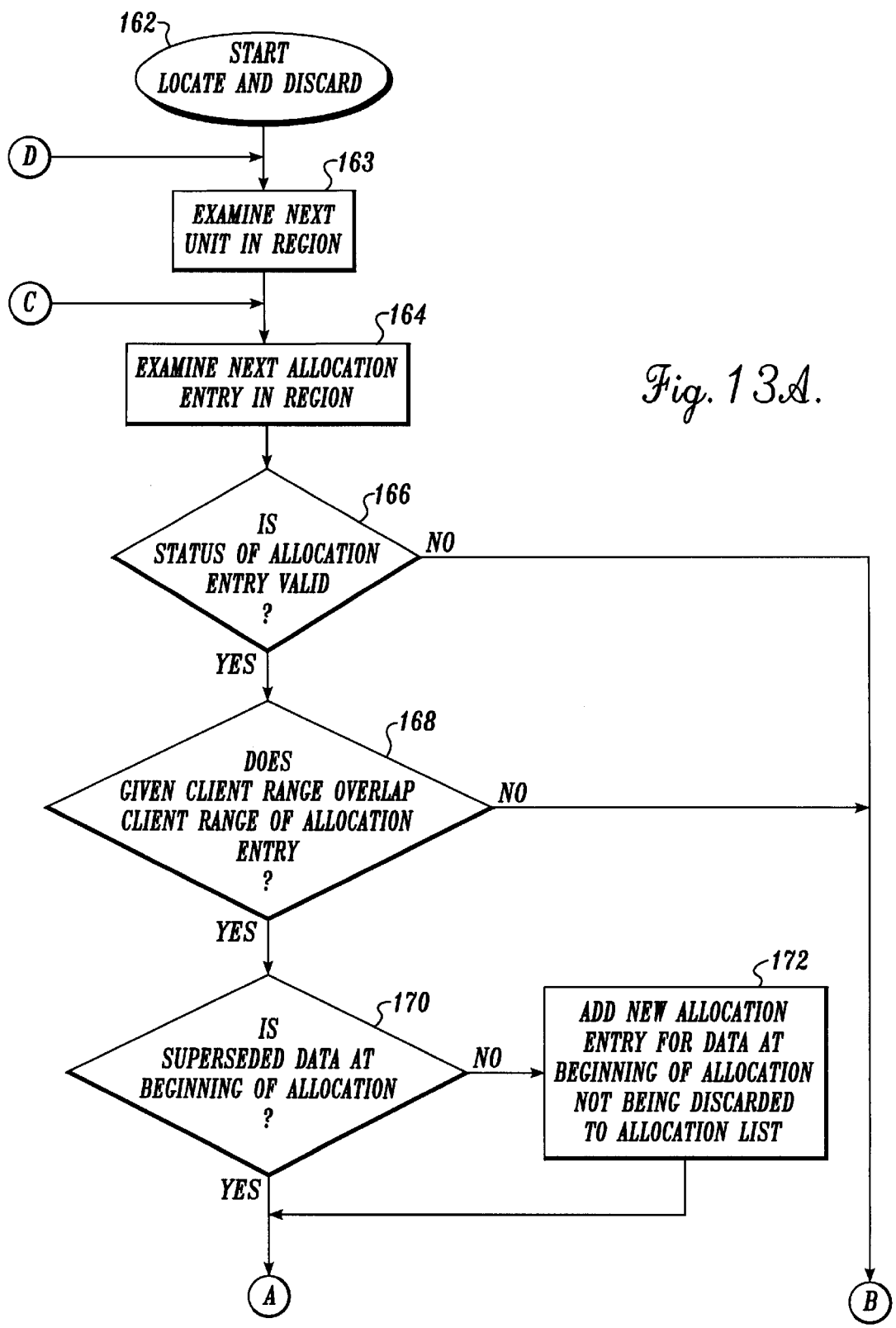
Figure 13B:
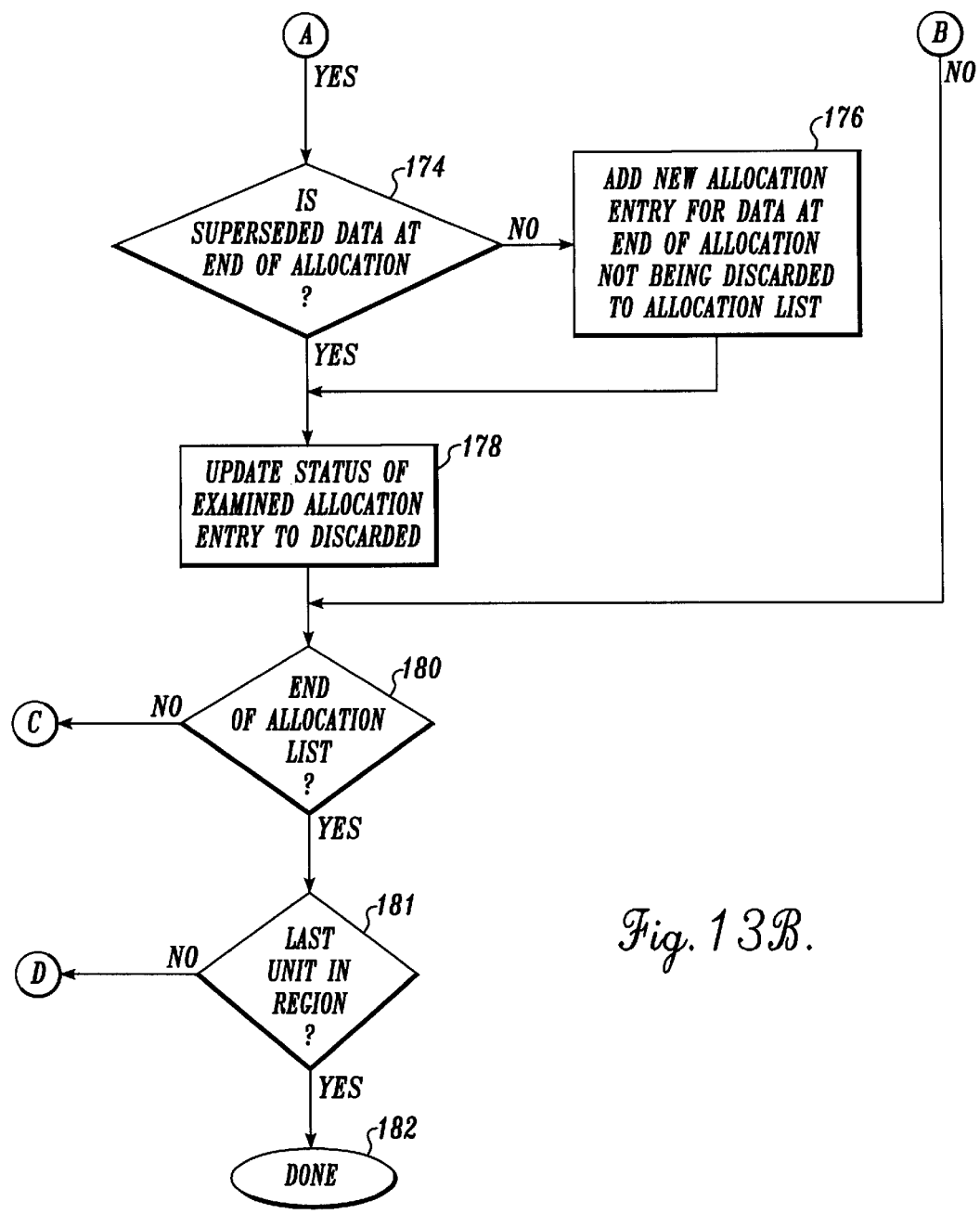

The logic employed by the present invention to discard data that has been superseded by the above-described write operation is illustrated in FIGS. 12 and 13A–B. In FIG. 12, the logic begins in a block 156 where the region in which data is to be discarded is determined using the given client range. Once the region has been determined, the data to be discarded is located within that region and the status of those allocations containing discarded data is updated in the corresponding allocation entries. In order to locate the data to be discarded, the allocation lists of each unit in the region are scanned. Thus, each allocation entry of each allocation list is examined one at a time to update the status stored in field 70 of the allocation entry as necessary. In a block 163, a next unit in the region is examined. In a block 164, a next allocation entry in the allocation list for that unit is examined. In a decision block 166, the logic determines if the status in field 70 of that allocation entry is valid. If so, at least some of the data in that allocation may be old, superseded data. The reason being that during the write operation, a newly written allocation is indicated by a pending status stored in the corresponding allocation entry. The status then remains pending until the status of those allocations containing data superseded during the write operation is changed from valid to discarded as described below.

If the results of decision block 166 are positive, the logic proceeds to a decision block 168 where it determines if the given client range overlaps the stored client range. If the result of either decision block 166 or decision block 168 is negative, i.e., if the status of the allocation is pending, discarded or bad; or if the given client range does not overlap the stored client range, there is no need to discard the data from this allocation and the logic skips blocks 170–178 and proceeds directly to decision block 180.

Figure 13C:
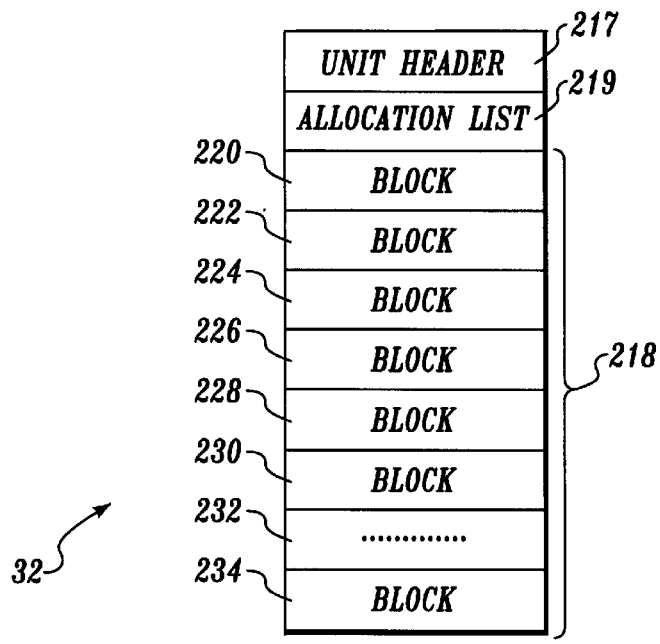
FIGS. 13C and 13D are block diagrams illustrating a unit before and after data has been discarded.

Returning to decision block 168, if the logic determines that the examined allocation contains data to be discarded, it must be determined where in the examined allocation the data must be discarded, because it is possible that only a portion of the data in the allocation is superseded. For example, the superseded data may be located at the beginning of the examined allocation, at the end of the examined allocation, or somewhere in between. FIG. 13C illustrates the latter case where a unit 32 includes a single allocation 218 in which all of the blocks, except the first and last, (i.e., blocks 222–232) contain superseded data.

In a decision block 170, the logic determines if the superseded data is located at a beginning of the examined allocation. In other words, it is determined if the stored client start address of the examined allocation entry falls within the given client range to be discarded. If this is not the data to be discarded, i.e., if the results are negative, the data is not superseded and must comprise a new allocation having a valid status and a new allocation length. Thus, a new allocation entry for the existing data is created and added to the allocation list of the unit in a block 172. Field 70 of the new allocation entry is set to valid and the client start address stored in field 72 of the examined allocation entry is stored in field 72 of the new allocation entry. A new allocation length for the new allocation equal to the length of the non-overlapping portion of the given client range and the stored client range is stored in field 74. Finally, the physical start address stored in field 76 for the examined allocation entry is stored in field 76 of the new allocation entry because the data is located at the beginning of the allocation being examined.

Figure 13D:
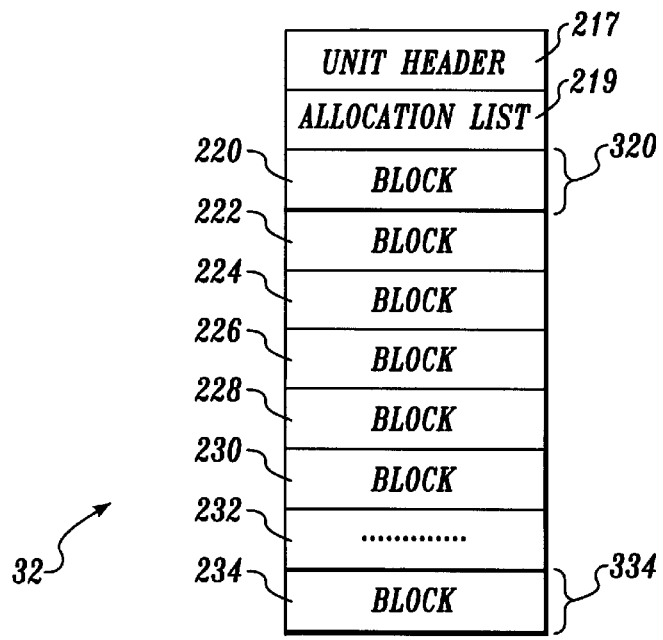

The result of the above described logic in the unit 32 depicted in FIG. 13C will be to create an allocation 320 for the data stored in the first block 220 of the unit 32 as shown in FIG. 13D. More specifically, since the data located at the beginning of the allocation 218 is not being discarded, a new allocation 320 will be created in the unit 32 for that data by adding a new allocation entry for allocation 320 to the allocation list 219.

Whether the superseded data is located at the beginning of the examined allocation or not, the logic proceeds to a decision block 174, where the logic determines if the superseded data is located at the end of the examined allocation. If the result of decision block 174 is negative, a new allocation for the non-superseded data must be created and a new allocation entry for the non-superseded data is added to the allocation list of the unit in block 176. The status in field 70 of the new allocation entry is set to valid. A new allocation length equal to the length of the non-overlapping portion of the given client range and the stored client range is stored in field 74. A new client start address is stored in field 72 that is equal to the client end address of the examined allocation minus the new allocation length, wherein the client end address is equal to the client start address plus the allocation length stored in fields 72 and 74 of the examined allocation entry. Finally, a new physical start address for the new allocation is stored in field 76 that is equal to the physical end address of the examined allocation minus the new allocation length, wherein the physical end address of the examined allocation equals the physical start address plus the allocation length stored in fields 76 and 74 of the examined allocation entry.

The result of the above described logic in the unit 32 depicted in FIG. 13C will be to create an allocation 334 for the data stored in the last block 234 of the unit as shown in FIG. 13D. More specifically, since the data located at the end of the allocation 218 is not superseded, a new allocation 334 will be created in the unit 32 for that data by adding a new allocation entry for allocation 334 to the allocation list 219 of the unit 32.

Once allocation entries have been created and added to the allocation list for the non-superseded data, the logic proceeds to a block 178 where the status in field 70 of the examined allocation entry is updated to indicate that the status of the corresponding allocation is discarded. Since new allocation entries have been created for any non-superseded data, it will be appreciated by those of ordinary skill in the art that updating the status of the examined allocation entry to discarded in block 178 effectively discards only the data for which new allocations and allocation entries have not been created. Thus, in the example depicted in FIGS. 13C and 13D, the superseded data located in blocks 222–232 will be considered discarded.

Although superseded data is discarded from the unit as described above, it is possible that only a portion of the superseded data is located in that unit. Thus, in a decision block 180 the logic determines if the end of the allocation list has been reached. If not, the next allocation entry in the unit is examined in block 164 to determine if the remaining superseded data to be discarded is located somewhere else in that unit. It will be appreciated that it is possible that the superseded data is located in more than one unit. Thus, if the result of decision block 180 is positive, the logic determines in a decision block 181 if the last unit of the region has been examined. If the results are negative, the logic returns to block 163 and the next unit in the region is examined. Blocks 163 through 181 are then repeated for each unit of the region until all of the superseded has been discarded.

Finally, it is possible for the superseded data to overlap multiple regions of client address space. If such is the case, the results of decision block 181 will be positive even if the superseded data has not been completely discarded. Those of ordinary skill in the art will recognize that in such cases, the logic illustrated in FIGS. 13A and 13B will merely be repeated for each region from which it is determined superseded data is to be discarded. However, it will be appreciated that all of the superseded data may be discarded well before the last unit of the region is examined. Thus, the logic described above could be easily modified by one of ordinary skill in the art to merely exit the discard operation when all of the superseded data has been discarded.

Figure 14A:
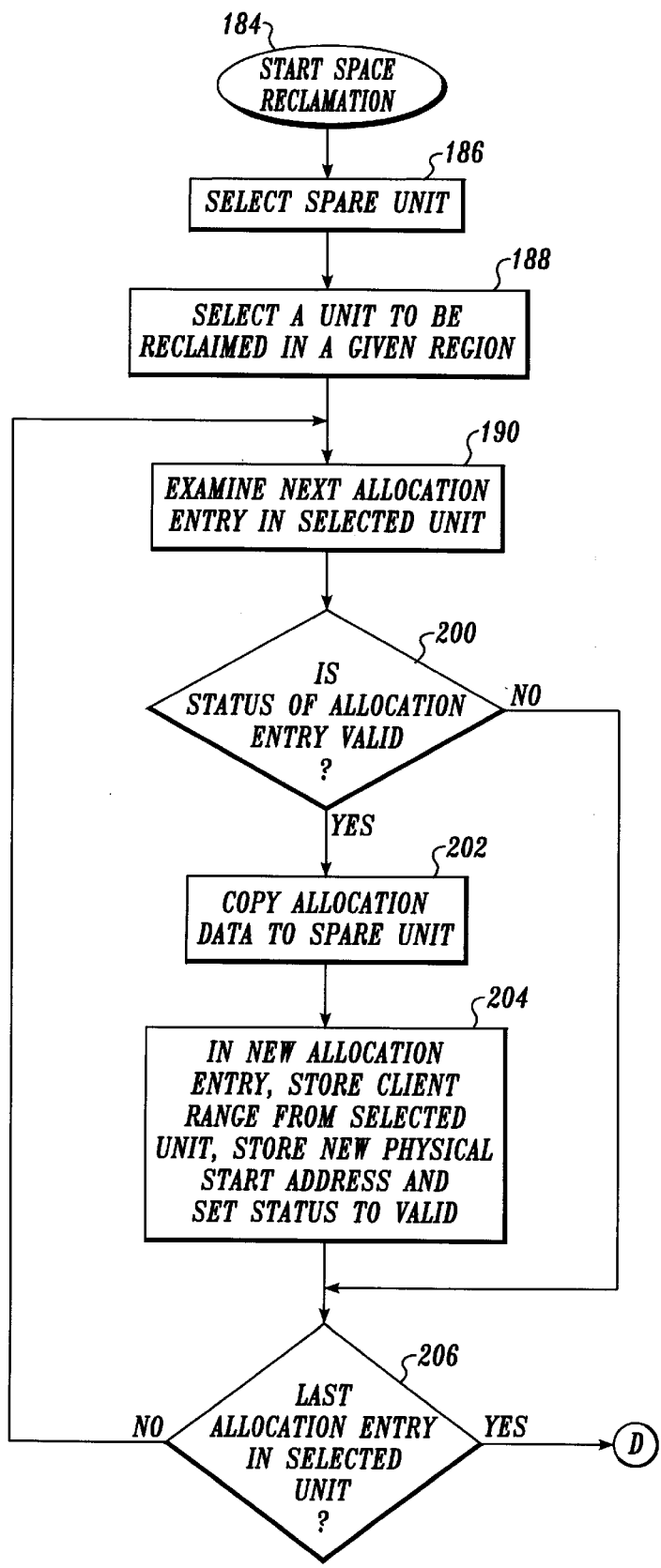
FIGS. 14A and 14B are flow diagrams illustrating the logic used for reclaiming space in the flash memory.
Figure 14B:
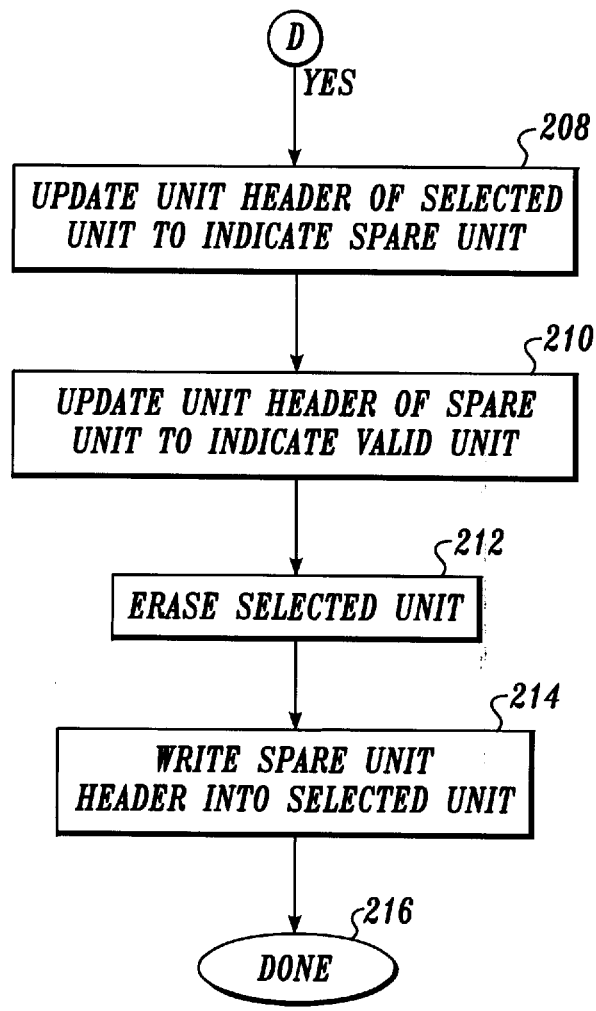

In addition to discarding data during a write operation, it may be necessary to reclaim space in which to write data so that the write operation can proceed. As discussed above, in flash memory 24, data cannot be written over preexisting data. The logic for such a reclamation operation is depicted in FIGS. 14A and 14B. The logic begins in FIG. 14A at a block 186 where a spare unit in the partition is selected. In the actual embodiment of the present invention, partition 28 includes only one spare unit that is identified as such in the unit header of the spare unit. The reclamation operation involves copying valid data from a valid unit to a spare unit, and erasing the previously valid unit, thus freeing the discarded data. It will be appreciated that the partition 28 may contain multiple spare units, or no spare units. In the case of multiple spare units, the spare unit to be used during reclamation can be selected using any set of criteria deemed suitable.

Once the spare unit is selected in block 186, the unit to be reclaimed, i.e., the unit whose valid data is to be copied and whose discarded data is to be erased, is selected in a given region and its unit header is updated to indicate that reclamation is in progress. It will be appreciated that numerous optimization techniques known to those of ordinary skill in the art can be used to select the most advantageous unit for reclamation. The allocation list for the selected unit must then be scanned to determine which allocations of the unit contain valid data. Thus, each allocation entry in the allocation list is examined one at a time beginning in a block 190 where the next allocation entry in the allocation list for the selected unit is examined. In a decision block 200, the logic determines if the status in field 70 of the allocation entry has been set to valid. If the result is positive, the logic proceeds to block 202 where the allocation corresponding to that allocation entry is copied to an allocation of the spare unit at a first available physical address in the unit. Thus, the first valid allocation will be copied to the first available address, the second valid allocation will be copied immediately after the first allocation, and etc., until all valid allocations have been copied. Accordingly, when reclamation is complete, the only space available in the new valid unit in which to write will begin immediately after the last copied allocation.

Once the data has been copied to an allocation in the spare unit, the allocation list for the spare unit must be updated. Therefore, in a block 204 a new allocation entry is added to the allocation list of the spare unit. The client start address and allocation length from the allocation in the selected unit is copied to fields 72 and 74, respectively, of the new allocation entry, the status stored in field 70 of the new allocation entry is set to valid, and a new physical start address for the allocation in the spare unit is stored in field 76 of the new allocation entry.

If the result of decision block 200 is negative, i.e., the logic determines that the status of the allocation corresponding to the allocation entry being examined is not valid, the allocation is not copied to the spare unit and the logic proceeds directly to decision block 206, skipping blocks 202 and 204. In a decision block 206, the logic determines if the last allocation entry in the selected unit has been examined. If the results are negative, the logic returns to block 190 where the next allocation entry in the selected unit is examined. Blocks 190–204 are then repeated until all of the allocation entries in the selected unit have been examined and all of the valid allocations in the selected unit have been copied to the spare unit. The logic then proceeds to a block 208 on FIG. 14B.

In block 208, the unit header of the selected unit is updated to indicate that the selected unit is now a spare unit. In a block 210, the unit header of the spare unit is updated to indicate that the spare unit is now a valid unit containing valid data. In a block 212, the selected unit is physically erased and in block 214 a generic spare unit header is written to the unit header of the selected unit, making the selected unit a spare unit.

Although the discard and reclamation operations have been described in conjunction with a write operation, those of ordinary skill in the art will recognize that it may be desirable or necessary to discard superseded data or reclaim space in a region independently of the write operation. For example, it may be desirable to discard data or reclaim space on demand in order to increase the available physical address space and to avoid having to do so in later calls to the write operation. The discard or reclamation operations may therefore be periodically performed as housekeeping by the flash control software 22 or for other operations.

While the preferred embodiment of the invention has been illustrated and described, it will be appreciated that various changes can be made therein without departing from the spirit and scope of the invention. For example, many of the logical steps discussed above can be performed in a different order without affecting the results of the operations. Primary storage 26 can be used to cache various data structures to avoid re-reading them from the flash memory 24. Additional fields may be added to the unit header of each unit and the allocation entries of each allocation list to store additional information. Hence, one of ordinary skill in the art will recognize that such optimizations would merely enhance the invention without departing from it.

The embodiments of the invention in which an exclusive property or privilege is claimed are defined as follows:

1. A method for allocating storage in an auxiliary storage medium, the auxiliary storage medium comprising at least one partition of physical address space, the method comprising:

(a) organizing the partition into a plurality of regions, each region defining a portion of client address space which represents a number of units of physical address space in the partition; and (b) organizing each unit of physical address space into a plurality of allocations, each allocation including at least one block of physical data storage locations in the unit.

2. The method of claim 1, further comprising using an allocation list for each unit of the partition to interface the client address space defined by the regions and the physical address space of the partition, the allocation list including at least one allocation entry describing each allocation in the unit, each allocation entry including: (i) a client start address for the allocation in the portion of client address space defined by the region representing the unit; (ii) an allocation length indicating the number of blocks in the allocation; (iii) a status of the allocation; and (iv) a physical start address for the allocation in the unit.

3. The method of claim 2, wherein using the allocation list for each unit comprises writing data to the partition at a given client range, the given client range including a given client start address in the client address space and a given allocation length for the data, writing data to the partition at the given client range comprising:

(a) determining a region of client address space representing the units in which to write the data by determining if the given client range falls within the portion of client address space defined by the region;

(b) determining if there is available physical address space in the units represented by the region to write the data;

(c) writing the data to the units represented by the region having available physical address space, wherein writing the data creates a new allocation in at least one unit represented by the region, the new allocation having a physical start address in the unit, an allocation length and a status indicating that data is currently being written to the new allocation; and (d) adding a new allocation entry to the allocation list that describes the new allocation, the new allocation entry including the given client start address, the allocation length of the new allocation, the status of the new allocation, and the physical start address of the new allocation.

4. The method of claim 3, further comprising reclaiming physical address space in the units represented by the region if there is not available physical address space in the units represented by the region to write the data.

5. The method of claim 3, wherein writing data to the units represented by the region further comprises discarding data in the given client range that was superseded when the data was written to the partition.

6. The method of claim 5, wherein writing data to the units represented by the region further comprises updating the status of the new allocation entry to indicate the data of the new allocation is valid after data that was superseded has been discarded.

7. The method of claim 3, wherein writing data to the units represented by the region further comprises:

(a) scanning the allocation list of a unit represented by the region to determine a first available physical start address in the unit to which data can be written;

(b) creating the new allocation in the unit by writing as much data as possible to the unit at the first available physical start address; and (c) repeating (a)–(b) for each unit represented by the region until the data for the region has been written.

8. The method of claim 3, wherein a plurality of regions are selected in which to write the data using the given client range and wherein (a)–(d) are repeated for each region until all of the data has been written to the partition.

9. The method of claim 2, wherein using the allocation list further comprises reading data from the partition at a given client range, the given client range including a given client start address in the client address space and a given allocation length for the data, reading data from the partition at the given client range comprising:

(a) determining a region of client address space representing the units from which to read the data by determining if the given client range falls within the portion of client address space defined by the region;

(b) scanning the allocation list of a unit represented by the region to determine a physical start address and a length for at least a portion of the data to be read;

(c) reading the portion of data from the unit at the physical start address and length; and (d) repeating (b)–(c) until as much data as possible has been read from the units represented by the region.

10. The method of claim 9, wherein scanning the allocation list of the unit further comprises:

(a) locating an allocation entry in the allocation list of the unit having a client range comprising a client start address and an allocation length that overlaps the given client range; and (b) determining the physical start address and length for the portion of the data using the overlapping given client range and the client range of the allocation entry.

11. The method of claim 10, wherein a plurality of regions are selected from which to read the data using the given client range and wherein (a)–(d) are repeated for each region until all of the data has been read from the partition.

12. The method of claim 2, wherein using the allocation list for each unit further comprises reclaiming physical address space in the units represented by the region in a given client range, the given client range including a given client start address in the client address space and a given allocation length for the data, reclaiming physical address space comprising:

(a) allocating at least one of the units represented by the region as a spare unit;

(b) selecting a unit represented by the region to be reclaimed;

(c) for each allocation in the selected unit described by an allocation entry in the allocation list of the unit, copying valid data from the selected unit to the spare unit by:

(i) examining the allocation entry in the allocation list that describes the allocation;

(ii) if the allocation entry includes a status indicating that the data in the unit is valid, copying the data in the allocation to a new allocation in the spare unit having a new physical start address in the unit; and (iii) adding a new allocation entry to the spare allocation list that includes (A) the client start address of the allocation in the selected unit from which the data is being copied; (B) the allocation length of the allocation in the selected unit from which the data is being copied; (C) the new physical start address of the new allocation in the spare unit; and (D) a status indicating that the data copied to the spare unit is valid;

(d) updating a unit header in the selected unit to indicate a new spare unit;

(e) updating a unit header in the spare unit to indicate a valid unit;

(f) erasing the new spare unit; and (g) updating a unit header in the selected unit to indicate a spare unit.

13. The method of claim 2, wherein using the allocation list for each unit further comprises discarding data in a given client range, the given client range including a given client start address in the client address space and a given allocation length for the data, discarding data in a given client range comprising:

(a) determining a region of client address space representing the units in which data is to be data by determining if the given client range falls within the portion of client address space defined by the region;

(b) scanning the allocation list of a unit represented by the region for an old allocation entry describing an old allocation having data to be discarded;

(c) determining if the data to be discarded is located at a beginning of the old allocation described by the old allocation entry, and if not, creating a new allocation entry for the existing data located at the beginning of the old allocation by adding the new allocation entry describing the new allocation to the allocation list of the unit, the new allocation entry including (i) the client start address of the old allocation; (ii) a new allocation length for the new allocation; (iii) the physical start address of the old allocation; and (iv) a status indicating that the data is valid;

(d) determining if the data to be discarded is located at an end of the old allocation described by the old allocation entry, and if not, creating a new allocation entry for the existing data located at the end of the old allocation by adding the new allocation entry describing the new allocation to the allocation list of the unit, the new allocation entry including (i) a new client start address for the new allocation; (ii) a new allocation length for the new allocation; (iii) a new physical start address for the new allocation; and (iv) a status indicating that the data is valid;

(e) updating the status of the old allocation entry to indicate that the allocation entry is no longer valid; and (f) repeating (b)–(e) for each unit within the region until all of the data to be discarded in the given client range is discarded.

14. The method of claim 13, wherein a plurality of regions are selected in which to discard data using the given client range and wherein (a)–(f) are repeated for each region until all of the data in the given client range that was superseded is discarded from the partition.

15. The method of claim 2, wherein a computer readable medium is encoded to perform the function of using an allocation list for each unit of the partition to interface the client address space defined by the regions and the physical address space of the partition.

16. An apparatus for allocating storage of data amongst storage mediums in a computer system, the apparatus comprising:

(a) a processing unit;

(b) an auxiliary storage medium, the auxiliary storage medium comprising at least one partition, the partition organized into a plurality of regions, each region defining a portion of client address space which represents a number of units in the partition;

(c) a main storage medium coupled to the processing unit, the storage medium at least temporarily storing program instructions that control the processing unit; execution of said program instructions on the processing unit comprising:

(i) organizing each unit into a plurality of allocations, each allocation including at least one block of physical data storage locations in the unit; and (iii) transferring storage of data to and from the auxiliary storage medium by using an allocation list for each unit of the partition to translate the client address space defined by the regions and the physical address space of the partition, the allocation list including at least one allocation entry describing each allocation in the unit, each allocation entry including (A) a client start address for the allocation in the portion of client address space defined by the region representing the unit; (B) an allocation length indicating the number of blocks in the allocation; (C) a status of the allocation; and (D) a physical start address for the allocation in the unit.

17. The apparatus of claim 16, wherein transferring storage of data to the auxiliary storage medium further comprises writing data to the partition of the auxiliary storage medium at a given client range, the given client range including a given client start address in the client address space and a given allocation length for the data, writing data to the partition at the given client range comprising:

(a) determining a region of client address space representing the units in which to write the data by determining if the given client range falls within the portion of client address space defined by the region;

(b) determining if there is available physical address space in the units represented by the region to write the data;

(c) writing the data to the units represented by the region having available physical address space, wherein writing the data creates a new allocation in at least one unit represented by the region, the new allocation having a physical start address in the unit, an allocation length and a status indicating that data is currently being written to the new allocation; and (d) adding a new allocation entry to the allocation list that describes the new allocation, the new allocation entry including the given client start address, the allocation length of the new allocation, the status of the new allocation, and the physical start address of the new allocation.

18. The apparatus of claim 17, further comprising reclaiming physical address space in the units represented by the region if there is not available physical address space in the units represented by the region to write the data.

19. The apparatus of claim 17, wherein writing data to the units represented by the region further comprises discarding superseded data in the given client range.

20. The apparatus of claim 19, wherein writing data to the units represented by the region further comprises updating the status of the new allocation entry to indicate the data of the new allocation is valid after the superseded data has been discarded.

21. The apparatus of claim 17, wherein writing data to the units represented by the region further comprises:

(a) scanning the allocation list of a unit represented by the region to determine a first available physical start address in the unit to which data can be written;

(b) creating the new allocation in the unit by writing as much data as possible to the unit at the first available physical start address; and (c) repeating (a)–(b) for each unit represented by the region until the data for the region has been written.

22. The apparatus of claim 17, wherein a plurality of regions are selected in which to write the data using the given client range and wherein (a)–(d) are repeated for each region until all of the data has been written to the partition.

23. The apparatus of claim 16, wherein transferring data from the auxiliary storage medium further comprises reading data from the partition of the auxiliary storage medium at a given client range, the given client range including a given client start address in the client address space and a given allocation length for the data, reading data to the partition at the given client range comprising:
  (x) determining a region of client address space representing the units from which to read the data using the given client range;
  (y) scanning the allocation list of a unit represented by the region to determine a physical start address and a length for at least a portion of the data to be read;
  (z) reading the portion of data from the unit at the physical start address and length; and
  (aa) repeating (b)–(c) until as much data as possible has been read from the units represented by the region.

24. The apparatus of claim 23, wherein scanning the allocation list of the unit further comprises:
  (a) locating an allocation entry in the allocation list of the unit having a client range comprising a client start address and an allocation length that overlaps the given client range; and
  (b) determining the physical start address and length for the at least a portion of the data using the overlapping given client range and the client range of the allocation entry.

25. The apparatus of claim 23, wherein a plurality of regions are selected from which to read the data using the given client range and wherein (a)–(d) are repeated for each region until all of the data has been read from the partition.

26. The apparatus of claim 16, wherein transferring data to and from the auxiliary storage medium further comprises reclaiming physical address space in the units represented by the region in a given client range, the given client range including a given client start address in the client address space and a given allocation length for the data, reclaiming physical address space comprising:
  (a) allocating one of the units represented by the region as a spare unit;
  (b) selecting a unit represented by the region to be reclaimed;
  (c) for each allocation in the selected unit described by an allocation entry in the allocation list of the unit, copying valid data from the selected unit to the spare unit by:
    (i) examining the allocation entry in the allocation list that describes the allocation;
    (ii) if the allocation entry includes a status indicating that the data in the unit is valid, copying the data in the allocation to a new allocation in the spare unit having a new physical start address in the unit; and
    (iii) adding a new allocation entry to the spare allocation list that includes (1) the client start address of the allocation in the selected unit from which the data is being copied; (2) the allocation length of the allocation in the selected unit from which the data is being copied; (3) the new physical start address of the new allocation in the spare unit; and (4) a status indicating that the data copied to the spare unit is valid;
  (d) updating a unit header in the selected unit to indicate a new spare unit;
  (e) updating a unit header in the spare unit to indicate a valid unit;
  (f) erasing the new spare unit; and
  (g) updating a unit header in the selected unit to indicate a spare unit.

27. The apparatus of claim 16, wherein transferring data to and from the auxiliary storage medium further comprises discarding data in a given client range, the given client range including a given client start address in the client address space and a given allocation length for the data, discarding data in a given client range comprising:
  (a) determining a region of client address space representing the units in which data is to be discarded by determining if the given client range falls within the portion of client address space defined by the region;
  (b) scanning the allocation list of a unit represented by the region for an old allocation entry describing an old allocation having superseded data;
  (c) determining if the superseded data is located at a beginning of the old allocation described by the old allocation entry, and if not, creating a new allocation entry for non-superseded data located at the beginning of the old allocation by adding the new allocation entry describing the new allocation to the allocation list of the unit, the new allocation entry including (A) the client start address of the old allocation; (2) a new allocation length for the new allocation; (3) the physical start address of the old allocation; and (4) a status indicating that the non-superseded data is valid;
  (d) determining if the superseded data is located at an end of the old allocation described by the old allocation entry, and if not, creating a new allocation entry for the data located at the end of the old allocation by adding the new allocation entry describing the new allocation to the allocation list of the unit, the new allocation entry including (A) a new client start address for the new allocation; (2) a new allocation length for the new allocation; (3) a new physical start address for the new allocation; and (4) a status indicating that the non-superseded data is valid;
  (e) updating the status of the old allocation entry to indicate that the allocation entry is no longer valid; and
  (f) repeating (b)–(e) for each unit until all of the superseded data in the given client range that is located in the unit is discarded.

28. The apparatus of claim 27, wherein a plurality of regions are selected in which to discard superseded data using the given client range and wherein (a)–(f) are repeated for each region until all of the superseded data in the given client range is discarded from the partition.

29. A computer-readable medium having a computer-executable component for allocating storage in an auxiliary storage medium, wherein the computer-executable component allocates storage in the auxiliary storage medium by:
  (a) establishing at least one partition of physical address space in the storage medium;
  (b) dividing the partition into a plurality of units, each unit comprising a portion of physical address space in the partition; and
  (c) defining a client address space by organizing the plurality of units into a plurality of regions, each region defining a portion of client address space which represents the portions of physical address space within the plurality of units into which the region is organized.

30. The computer-readable medium of claim 29, wherein the computer-executable component further allocates storage in the auxiliary storage medium by organizing each unit into a plurality of allocations, each allocation including at least one block of physical data storage locations in the unit.

31. The computer-readable medium of claim 30, wherein the computer-executable component uses an allocation list for each unit of the partition to interface the client address space defined by the regions to the physical address space of the partition, the allocation list including at least one allocation entry describing each allocation in the unit, each allocation entry including: (i) a client start address for the allocation in the portion of client address space relative to the region in which the unit is organized; (ii) an allocation length indicating the number of blocks in the allocation; (iii) a status of the allocation; and (iv) a physical start address for the allocation in the unit.

32. The computer-readable medium of claim 31, wherein the computer-executable component uses the allocation list for each unit of the partition write data to the partition at a given client range, the given client range including a given client start address in the client address space and a given allocation length for the data, wherein the computer-executable component uses the allocation list to write data by:
  (a) determining a region of client address space representing the units in which to write the data using the given client range;
  (b) determining if there is available physical address space in the units represented by the region to write the data;
  (c) writing the data to the units represented by the region having available physical address space, wherein writing the data creates a new allocation in at least one unit represented by the region, the new allocation having a physical start address in the unit, an allocation length and a status indicating that data is currently being written to the new allocation; and
  (d) adding a new allocation entry to the allocation list that describes the new allocation, the new allocation entry including the given client start address, the allocation length of the new allocation, the status of the new allocation, and the physical start address of the new allocation.

33. The computer-readable medium of claim 32, wherein writing data to the units represented by the region further comprises:
  (a) scanning the allocation list of a unit represented by the region to determine a first available physical start address in the unit to which data can be written;
  (b) creating the new allocation in the unit by writing at least a portion of the data to the unit at the first available physical start address; and
  (c) repeating (a)–(b) for each unit represented by the region until the data for the region has been written.

34. The computer-readable medium of claim 33, wherein the computer-executable component further uses the allocation list to write data by selecting a plurality of regions representing units in which to write the data using the given client range and wherein (a)–(c) are repeated for each region until all of the data has been written to the partition.

35. The computer-readable medium of claim 31, wherein the computer-executable component further uses the allocation list to read data from the partition at a given client range, the given client range including a given client start address in the client address space and a given allocation length for the data, wherein the computer-executable component uses the allocation list to read data by:
  (a) determining a region of client address space representing the units from which to read the data using the given client range;
  (b) scanning the allocation list of a unit of the region to determine a physical start address and a length for at least a portion of the data to be read;
  (c) reading the portion of data from the unit at the physical start address and length; and
  (d) repeating (b)–(c) until as much data as possible has been read from the region.

36. The computer-readable medium of claim 35, wherein scanning the allocation list of the unit further comprises:
  (a) locating an allocation entry in the allocation list of the unit having a client range comprising a client start address and an allocation length that overlaps the given client range; and
  (b) determining the physical start address and length for the portion of data using the overlapping given client range and the client range of the allocation entry.

37. The computer-readable medium of claim 36, wherein the computer-executable component further uses the allocation list to read data by selecting a plurality of regions from which to read the data using the given client range and wherein (a)–(b) are repeated for each region until all the data has been read from the partition.

* * * * *